United States Patent [19]
Hashiguchi et al.

[11] Patent Number: 5,061,880
[45] Date of Patent: Oct. 29, 1991

[54] METHOD OF DRIVING IMAGE DISPLAY DEVICE

[75] Inventors: Jumpei Hashiguchi, Suita; Kinzo Nonomura, Ikoma; Kiyoshi Hamada, Sakai; Satoshi Kitao, Kyoto; Masayuki Takahashi, Katano, all of Japan

[73] Assignee: Matsushita Electric Industrial Co., Ltd., Osaka, Japan

[21] Appl. No.: 494,627

[22] Filed: Mar. 16, 1990

[30] Foreign Application Priority Data

Mar. 22, 1989 [JP] Japan ................................. 1-069715

[51] Int. Cl.$^5$ ................... G09G 1/04; H01J 29/70; H01J 29/56
[52] U.S. Cl. ................................. 315/366; 315/383; 315/371
[58] Field of Search .............. 315/371, 383, 391, 395, 315/366

[56] References Cited

U.S. PATENT DOCUMENTS

| | | | |
|---|---|---|---|
| 3,440,480 | 4/1969 | Henderson | 315/394 |
| 3,449,620 | 6/1969 | Caron et al. | 315/383 |
| 4,127,796 | 11/1978 | Henderson | 315/395 |
| 4,227,117 | 10/1980 | Watanabe et al. | 315/366 |

*Primary Examiner*—Gregory C. Issing
*Attorney, Agent, or Firm*—Stevens, Davis, Miller & Mosher

[57] ABSTRACT

A method of driving an image display device is disclosed in which electron beams from line cathodes are impinged upon a display screen through beam modulating and deflecting electrodes to display an image. Each beam roughly lands onto a predetermined position on the screen by a stepped deflection voltage waveform to form a spot on the screen while the beam is deflected around the predetermined position by an unstepped deflection voltage waveform. The timing of application or the pulse width of a driving pulse signal for the beam modulating electrode is controlled in a form temporally related to the driving of the beam deflecting electrode to control the landing position or diameter of the spot on the screen. In the case where the driving pulse signal is a signal the pulse width of which is modulated by a video signal, the pulse width is changed in accordance with the level of the video signal and equally in positive and negative directions around the instant of time when a signal pulse having the minimum width necessary for representation as an image is to be generated.

10 Claims, 15 Drawing Sheets

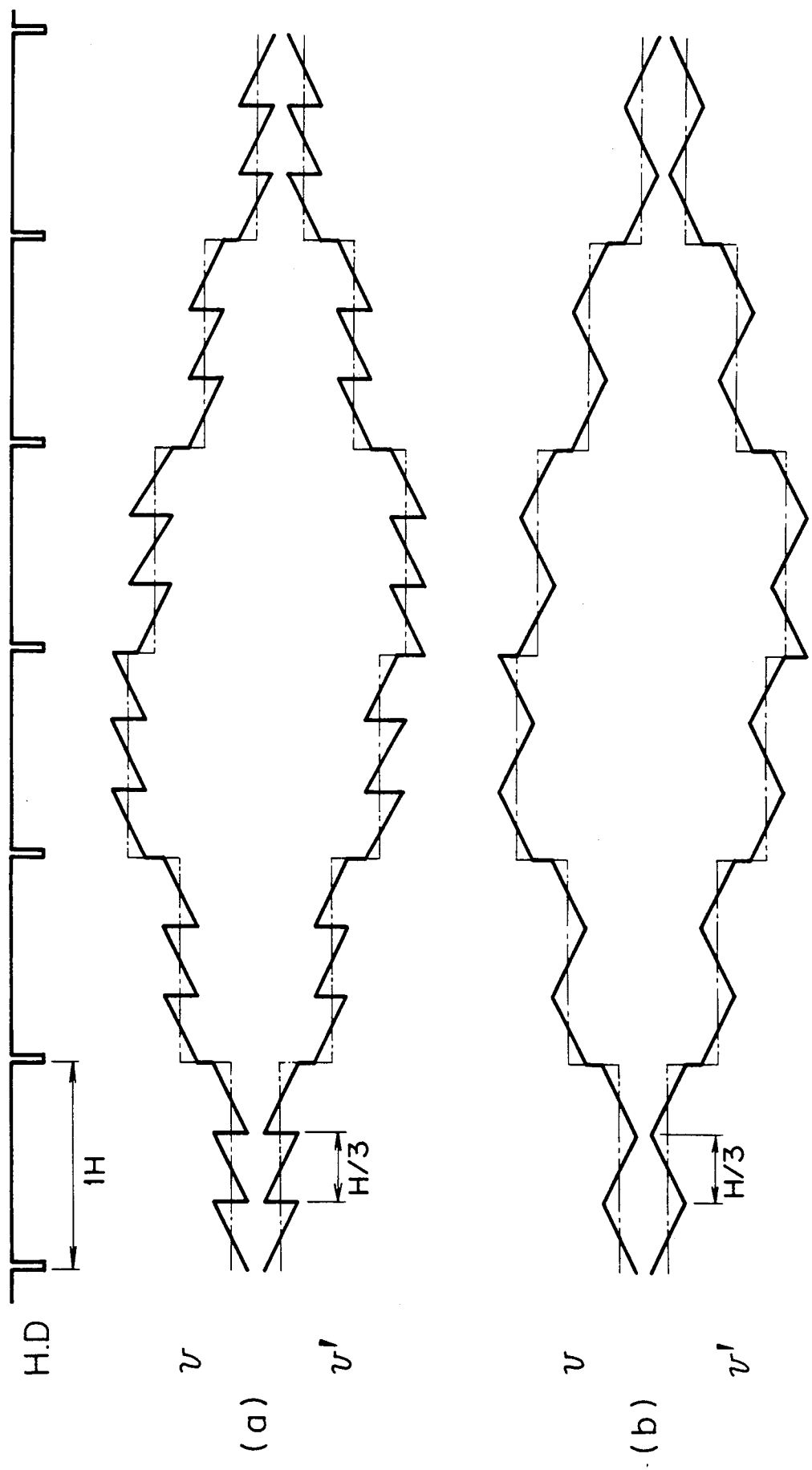

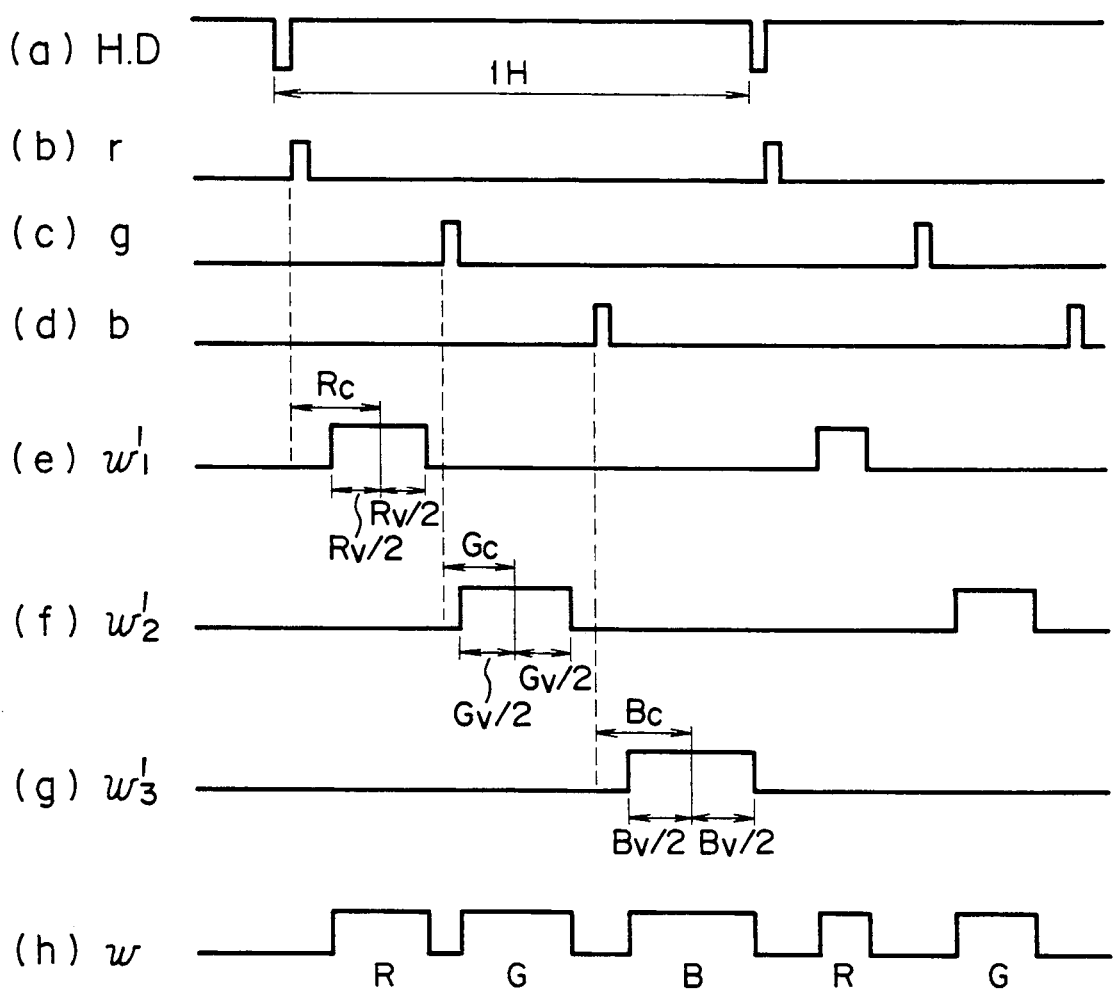

METHOD OF DRIVING IMAGE DISPLAY DEVICE

BACKGROUND OF THE INVENTION

The present invention relates to a technique of driving a flat type image display device used in a display for the like of a television receiver or a computer.

As one of the prior arts is known an image display device described by U.S. Pat. No. 4,227,117 assigned to the assignee of the present application. FIG. 12 is a view showing the construction of a flat type cathode-ray tube which has an internal structure slightly different from that of the display device of the U.S. Pat. No. 4,227,117 but displays an image in accordance with substantially the same principle as the display device of U.S. Pat. No. 4,227,117. The display device shown in FIG. 12A or FIG. 12B includes line-like thermionic cathodes 1 (hereinafter referred to as line cathodes) as electron beam emitting sources, a back face electrode 2 which is disposed opposing the line cathodes 1 and on a side reverse to an image display plane, and a plate-like electron beam extracting electrode 3, an electron beam modulating electrode 4, a vertical focusing electrode 5, a horizontal focusing electrode 6, horizontal deflection electrodes 7, 7', vertical deflection electrodes 8, 8' and a phosphor-coated screen 9 which are successively disposed opposing the line cathodes 1 and on the same side as the image display plane. Here, FIG. 12B is a structural drawing showing a practical structure of conventional flat type cathode-ray tube corresponding to the cathode-ray tube shown in FIG. 12A. These components are accommodated in a flat vacuum glass vessel (not shown).

Each line cathode 1 functioning as the beam source is stretched in a horizontal direction and a plurality of such line cathodes (L in the explanation and four in the illustration in FIG. 12A or FIG. 12B) are disposed at proper intervals along a vertical direction. The line cathode 1 has a structure in which an oxide cathode material is applied on the surface of a tungsten filament of, for example, 20 to 30 $\mu m \phi$.

The back face electrode 2 made of a conductive plate which may be planar, has a function of suppressing the generation of an electron beam or pushing the generated electron beam toward the display plane side.

The electron beam extracting electrode 3 is a plate-like electrode having M beam transmissive apertures which are provided at each of locations opposite to the line cathodes 1-1 to 1-L and at proper intervals in the horizontal direction. A part of an electron beam extracted from the heated line cathode 1 toward the display plane side by the electron beam extracting electrode 3 is passed through the apertures of the electron beam extracting electrode 3. When passed through the apertures, the beam is divided into M beams in the horizontal direction.

The electron beam modulating electrode 4 provided next to the electron beam extracting electrode 3 is divided into M segments in the horizontal direction so as to permit independent and simultaneous control of the quantities of transmission of the M divisional electron beams from the beam transmissive apertures of the electron beam extracting electrode 3. Only four segments of the electron beam modulating electrode 4 are shown.

The vertical focusing electrode 5 or the horizontal focusing electrode 6 has slits elongated in the vertical direction or the horizontal direction or apertures elongated in the vertical direction or the horizontal direction and serves to focus each beam in the vertical direction or the horizontal direction.

The horizontal deflection electrode includes M pairs of electrodes 7 and 7' with each of the divisional electron beams being sandwiched between the one pair of electrodes 7 and 7' on opposite sides in the horizontal direction. The beam is deflected in the horizontal direction by virtue of a potential difference applied between the paired electrodes 7 and 7'. Since the electrodes 7 in the M pairs and the electrodes 7' in the M pairs are connected by respective common buses or frames 12, the deflection is made for M beams for each line all at once.

The vertical deflection electrode includes L pairs of electrodes 8 and 8' with all of the beams for one line being sandwiched between one pair of electrodes 8 and 8' on opposite sides in the vertical direction. Each beam is deflected in the vertical direction by virtue of a potential difference applied between the paired electrodes 8 and 8'. The electrodes 8 in the L pairs and the electrodes 8' in the L pairs are connected by respective common buses or frames 12 so as to drive the beams such that the directions of vertical deflection of the beams corresponding to adjacent line cathodes 1 are reversed to each other.

Electron beams subjected to the focusing, modulation and deflection mentioned above are accelerated by a high voltage applied to the screen 9 so that the electron beams impinge upon phosphors on the screen 9 to excite the phosphors into luminescence. The screen 9 is formed by applying three-color (R, G and B) phosphors in stripe shapes with blacks therebetween on a glass plate and depositing a metal back layer on the phosphor stripes. The phosphor stripe is formed, for example, so that one pair of R, G and B (or one triplet) correspond to each of the beam transmissive apertures of the electron beam modulating electrode 4. Each of image display sections 10 shown by broken lines in FIG. 12 represents a region where an image is displayed by one beam which is passed through the modulating electrode 4 and is deflected in the vertical and horizontal directions. The plurality of image display sections 10 are connected on the screen 9 to display one image as a whole.

Next, a method of driving the conventional display device will be explained by use of FIG. 13 which shows a block diagram of the basic driving circuit and FIG. 14 which shows the waveforms of driving signals for the respective electrodes.

Reference signals for driving are a vertical synchronizing signal V.D, a horizontal synchronizing signal H.D which are separated from a television video signal 21 at a sync separator circuit 22 and a clock signal generated at a system clock generating circuit 32. The explanation will be made supposing a video signal in an NTSC system. Now, assume that the number of the line cathodes 1 is L. Then, in an effective vertical scanning period of a vertical scanning period IV excepting a vertical blanking interval (or a period of 240H corresponding to 240 horizontal scanning periods), L pulses $k_1$ to $k_L$ having different phases and each having a low potential during only a period of time corresponding to the width of (240/L)H are generated and are successively applied to the line cathodes 1-1 to 1-L. The cathode driving pulses are generated in such a manner that a pulse having a pulse width of (240/L)H is sequentially shifted in a line cathode driving circuit 24 by virtue of trigger pulses $p_1$ to $p_L$ each of which is generated by a vertical driving pulse generating circuit 23 each time it counts 240/L horizontal synchronizing signals H.D.. The back face electrode 2 is applied with a DC potential $V_2$ which is slightly lower than the low potential level of the pulse applied to the line cathode, and the beam extracting electrode 3 is applied with a DC potential $V_3$ which is sufficiently higher than the low potential level of the pulse applied to the line cathode. $V_2$ and $V_3$ are supplied from a power source circuit 20. During a period of time when the potential of the line cathode 1 is high, the cathode is heated but no electrons are extracted from the cathode. Only in periods of time when the potentials of the line cathodes 1-1 to 1-L are made low by the pulses $k_1$ to $k_L$, electron beams are successively extracted from the line cathodes 1-1 to 1-L.

The extracted electron beam is modulated in accordance with a video signal voltage including image information. In order to display a color image, it is necessary to excite three R, G and B phosphors into luminescence for R, G and B video signals, respectively. In the illustrated example, there is employed a method in which R, G and B video signals are successively applied to the modulating electrodes 4-1 to 4-M on the time-sequential basis in synchronism with the horizontal deflection. A video signal 21 is demodulated by a color demodulation circuit 34 into R, G and B signals which in turn are digitized by A/D converters 25-1 to 25-M at each timing triggered by pulses $S_1$ to $S_M$ generated at a sampling pulse generating circuit 33 and are then held in video memories 26-1 to 26-M for a period of time 1H. The held data are sent to modulating circuits 27-1 to 27-M in a period of time for change-over of 1H in accordance with a read-out pulse f. In the modulating circuits, the digital data are converted into analog signals having pulse widths proportional to the values of data or analog signals having pulse amplitudes proportional to the values of data. The analog signals are applied to the beam modulating electrodes 4-1 to 4-M in the form of a serial signal of R, G and B by switching pulses $S_R$, $S_G$ and $S_B$ which are generated at a switching pulse generating circuit 28 synchronizing horizontal driving pulses r, g and b which are generated at a horizontal driving pulse generating circuit 29. An example of the modulation signal is shown in FIG. 14, as w. The timings of application of the R, G and B pulses are matched to periods of time when the beam is resting on R, G and B phosphors at three steps synchronizing the horizontal driving pulses r, g and b in one horizontal deflection period 1H. Since (M) video signals for one line in the horizontal direction can be simultaneously applied to the modulating electrode 4, there is provided a line-sequential or line-by-line display system in which an image for one line can be displayed at a time.

The modulated electron beam is focused in the vertical and horizontal directions by DC potentials $V_5$ and $V_6$, which are generated at the power circuit 20, applied to the vertical focusing electrode 5 and the horizontal focusing electrode 6 and is thereafter electrostatically deflected by the horizontal deflection electrodes 7 and 7'. The deflection is effected by stepped deflection waveforms h and h' shown in FIG. 14 which are generated at a horizontal deflection driving circuit 30. Provided that the deflection width is selected to be equal to one triplet of R, G and B, the deflection waveform h or h' synchnous with the horizontal synchronizing signal H.D takes a stepped waveform in which the voltage is step-wise raised or lowered at every H/3 period synchronizing the horizontal driving pulses r, g and b.

Accordingly, the electron beam rests on the R, G and B phosphors for H/3 periods, respectively.

On the other hand, the deflection in the vertical direction is effected by stepped deflection waveforms v and v' which are generated at a vertical deflection driving circuit 31. Since a period of time when the beam is extracted from each cathode is (240/L)H, each beam is deflected with (240/L) steps (in the shown example, 240/80 = 3 steps on the assumption that L = 80) in the vertical direction or the deflection over the whole of the screen is made with 240 steps in total in one vertical scanning period (or one field) to depict 240 rasters. In the next field, the voltage value of the vertical deflection waveform is shifted so that beams land between the rasters depicted in the preceding field. Namely, an interlace scanning is performed.

The horizontal deflection and the vertical deflection are made in the above manner so that one image display section 10 is formed by 3 (in the vertical direction) × 3 (in the horizontal direction) spots excited into luminescence by one electron beam accelerated by a high voltage $V_9$ applied to the screen 9, and such image display sections 10 are regularly arranged on the screen 9 to provide one image.

In the above flat type cathode-ray tube described as the prior art or another display device with a deflection of a plurality of electron beams, the uniformity of image quality is deteriorated unless the landing state of the electron beam on the screen 9 is uniform at any point.

Because the non-uniformity of beam landing positions and luminous spot shapes in the vertical direction appears as stepped brightness differences at the boundary portions between adjacent image display sections and the non-uniformity of landing positions and luminous spot shapes in the horizontal direction appears as stepped brightness differences or color differences at the boundary portions. The non-uniformity of beam landing positions is caused from the precision of work and the precision of assemblage of electrodes which contribute to vertical deflection or horizontal deflection in the flat type cathode-ray tube. However, as an area where an image is to be displayed is enlarged, it becomes difficult in view of technique and cost to enhance each of the precision of work and the precision of assemblage up to a level at which the image is not affected. Therefore, attempts to control the beam landing by use of electrical means have been proposed by, for example, U.S. Pat. No. 4,451,852. However, since it is not possible to drive deflection electrodes separately for individual beams, it was not possible to eliminate localized non-uniformity of landing.

The non-uniformity is shape of luminous spots is caused from a change in focusing characteristic of a beam depending on the degree of deflection of the beam which change is produced since the screen plane is planar of flat. This may be prevented by making the deflection angle as small as possible. For accomplishment of that purpose in a large-area display device may be considered, for example, a measure in which the deflection angle in the vertical direction is reduced by increasing the number of line cathodes and the deflection angle in the horizontal direction is reduced by increasing the number of electron beams into which an electron beam from one line cathode is to be divided. However, this measure is not proper since there results in an increase of a power consumption required for heating and an increase in cost or the precision of work electrodes in cost or the precision of work electrodes must be further enhanced. Also, there was not a method of coping with localized non-uniformity in shape of spots.

SUMMARY OF THE INVENTION

An object of the present invention is to solve the above problems of the prior art.

According to a first aspect of the present invention, there is provided a method of driving an image display device comprising at least a plurality of electron beam generating means, electron beam quantity controlling electron beam deflecting means, and luminous means excited into luminescence by impingement of an electron beam thereupon, in which deflection means for making an electron beam roughly land onto a predetermined position on the luminous means, deflection means for displacing the beam landing position within a minute range including the predetermined position, and means for controlling the instant of time of application of a driving signal for the electron beam quantity controlling means in a form temporally related to the driving of the electron beam deflecting means are provided to control the luminescence of the luminous means.

According to a second aspect of the present invention, there is provided a method of driving an image display device comprising at least a plurality of electron beam generating means, electron beam quantity controlling means, electron beam deflecting means, and luminous means excited into luminescence by impingement of an electron beam thereupon, in which deflection means for making an electron beam roughly land onto a predetermined position on the luminous means, deflection means for displacing the beam landing position within a minute range including the predetermined position, and means for controlling the duration of a driving pulse signal for the electron beam quantity controlling means in a form temporally related to the driving of the electron beam deflecting means are provided to control the luminescence of the luminous means.

According to a third aspect of the present invention, there is provided a method of driving an image display element in which the means mentioned in conjunction with the first or second invention are provided, the driving signal for the electron beam quantity controlling means is a pulse signal the pulse width of which is modulated by a video signal, and there is provided means for changing the pulse width of the driving pulse signal in accordance with the level of the video signal and equally in positive and negative directions around an instant of time when a pulse having the minimum width necessary for representation as an image is to be generated.

The first, second and third aspects of the present invention provide the following functions.

With the construction according to the first aspect of the present invention, each electron beam roughly lands on the predetermined position on a screen by a stepped vertical or horizontal deflection component to form a luminous spot and an unstepped deflection component such as sawtooth wave deflects the electron beam around the predetermined position from up to down or from down to up on the screen or from left to right or from right to left on the screen to the extent of about a half of a distance to a spot which is excited into luminescence by an electron beam adjacent to the electron beam under consideration in the vertical or horizontal direction. If the instant of time of application of the driving pulse to the electron beam quantity controlling means or a modulating electrode is controlled in positive and negative directions in synchronism with the deflection of the electron beam, a position where the electron beam lands on the screen or a spot position where a phosphor is excited into luminescence can be changed upward or downward or leftward or rightward within a range of the distance by which the electron beam is deflected in the vertical or horizontal direction by the sawtooth deflection component.

With the construction according to the second aspect of the present invention, each electron beam roughly lands on the predetermined position on a screen by a stepped vertical or horizontal deflection component to form a luminous spot and an unstepped deflection component such as sawtooth wave deflects the electron beam around the predetermined position from up to down or from down to up on the screen or from left to right of from right to left on the screen to the extent of about a half of a distance to a spot which is excited into luminescence by an electron beam adjacent to the electron beam under consideration in the vertical or horizontal direction. If the pulse width of the driving pulse signal to the electron beam quantity controlling means or a modulating electrode is controlled in synchronism with the deflection of the electron beam so that it is widened or narrowed in conformity with the angle of deflection, a range of positions where the electron beam lands on the screen or the diameter of a spot where a phosphor is excited into luminescence can be increased or reduced within a range of the distance by which the electron beam is deflected in the vertical or horizontal direction by the sawtooth deflection component.

With the construction according to the third aspect of the present invention, the pulse width of the driving signal for the electron beam quantity controlling means or the pulse signal pulse width-modulated by the video signal is changed in accordance with the level of the video signal and equally in positive and negative directions around the instant of time of generation of the pulse having the minimum width necessary for representation as an image when the above-mentioned function provided by the construction according to the first or second aspect of the present invention is effected, it is possible to change the center position of the luminous spot in accordance with the level of the video signal without an inconvenience that a range of beam landing positions on the screen from is one-sided to either one of upward and downward directions or either one of rightward and leftward directions on the screen when the pulse duration changes from its minimum value to the maximum value.

BRIEF DESCRIPTION OF THE DRAWINGS

FIG. 2 is a time chart showing variations of deflection waveforms;

FIG. 11 is a time chart of signal waveforms in operation of the third embodiment;

DESCRIPTION OF THE PREFERRED EMBODIMENTS

The first embodiment of the present invention will now be explained in reference to FIGS. 1 to 6. The explanation will be made limited to the beam landing in a vertical direction in order to avoid complexity.

Figure 1:
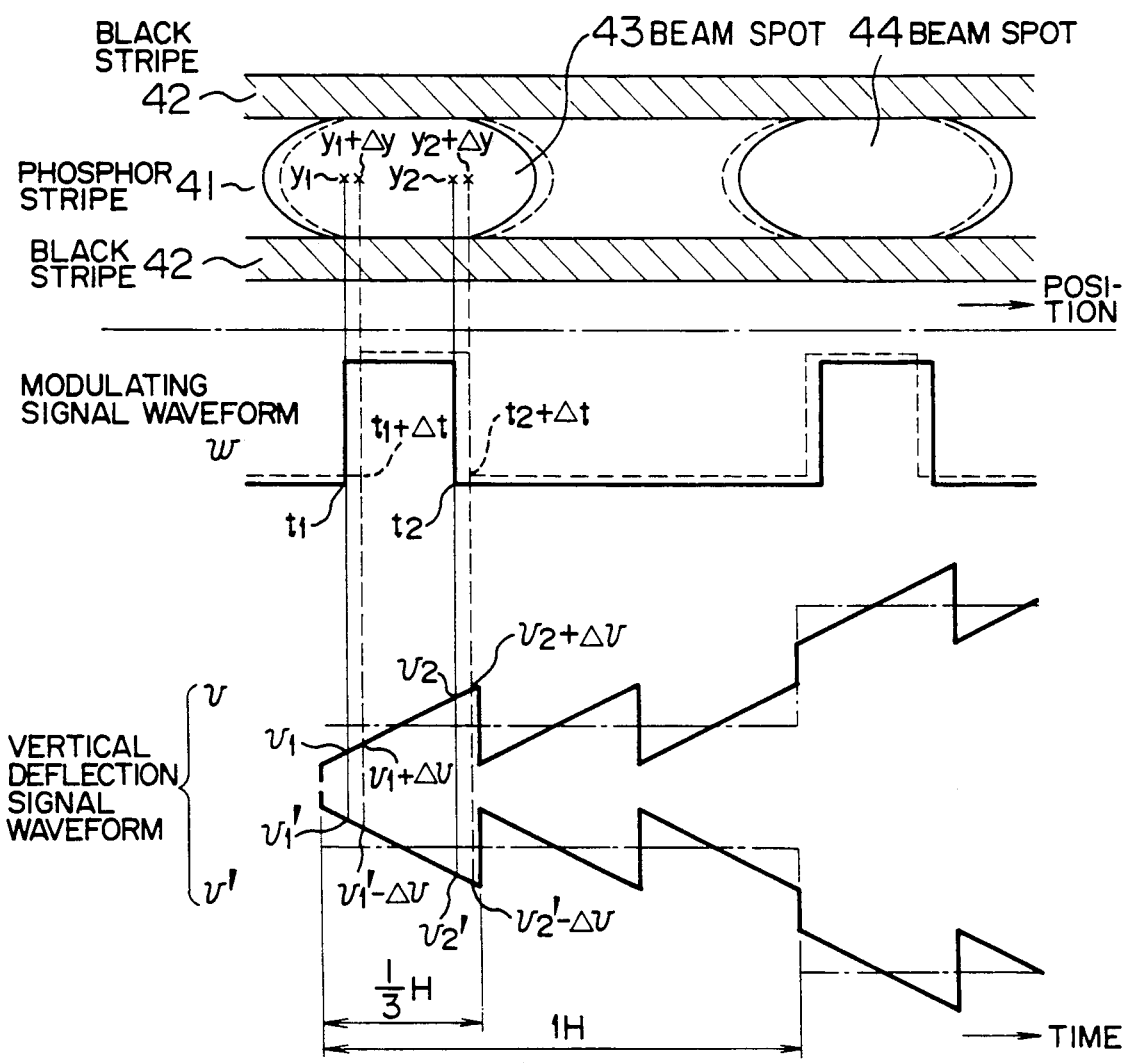
FIG. 1 is a view for explaining the operation of a first embodiment of the present invention.
Figure 3A:
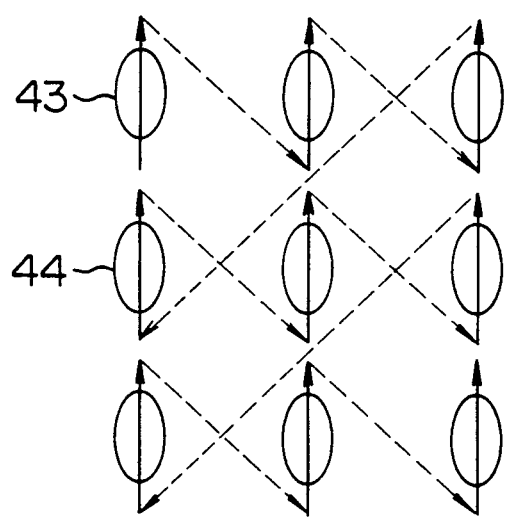
FIGS. 3a and 3b are views showing the directions of movement of beam spots by the deflection waveforms.
Figure 3B:
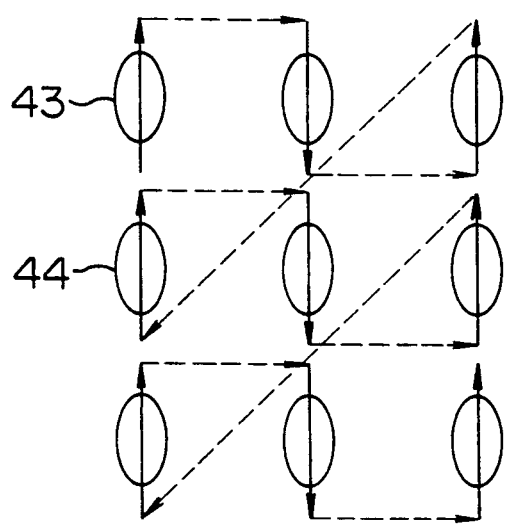

First, explanation will be made of voltage waveforms used for the deflection and modulation of an electron beam and the principle of change in position of a luminous spot on a screen in association with the voltage waveforms. The upper portion of FIG. 1 shows a phosphor stripe 41 formed on the screen and a beam spot 43 in a form in which the vertical direction and the horizontal direction are interchanged as a matter of convenience. The lower portion of FIG. 1 shows a pair of vertical deflection voltage waveforms v and v' and an electron beam modulating signal waveform w.

As shown in (a) or (b) of FIG. 2, each of the vertical deflection waveforms v and v' has a waveform in which a sawtooth wave, a triangular wave or another continuously changing voltage waveform having a period of H/3 is superimposed on the conventional stepped voltage waveform (shown by one-dotted chain line in the figure) ascending or descending at every 1H. The polarities of change of the deflection voltages v and v' are made reverse to each other. The period of the sawtooth wave is determined by the number of phosphor stripes excited into luminescence through the stepped horizontal deflection of an electron beam during the period of 1H, and the period of H/3 for the sawtooth wave is selected on the assumption that three stripes of R, G and B are excited into luminescence. If the number of horizontal deflection steps is changed, it is necessary to correspondingly change the period of the sawtooth wave.

Due to the use of the above vertical deflection waveforms v and v', an electron beam oscillates at a period of H/3 in the vertical direction without resting on the same position during the period of 1H as in the conventional device. The oscillations of respective beam spots take directions of arrow shown in FIG. 3A or FIG. 3B. The amplitude of the sawtooth wave is set such that the amplitude of the oscillation falls within about a half of a distance between beam spots 43 and 44 adjacent to each other in the vertical direction on the screen in FIG. 1. The reason is that the deterioration of a resolution due to the overlapping of beam spots 43 and 44 is prevented.

For the above vertical deflection waveform v and v', a beam modulating signal w having a pulse width within the period of H/3 is applied to the electron beam modulating electrode 4. If a pulse waveform shown by solid line in FIG. 1 is employed as the beam modulating signal w, the electron beam excites the phosphor 41 into luminescence while moving in the vertical direction in accordance with the vertical deflection voltage waveforms from the instant of time $t_1$ of rise of the pulse w until the instant of time $t_2$ of fall of the pulse w. Namely, the beam spot 43 moves from a position $y_1$ on the phosphor corresponding to the voltage values $v_1$ and $v_1'$ of the deflection waveforms v and v' to a position $y_2$ corresponding to the voltage values $v_2$ and $v_2'$. In this time, the beam spot takes a shape shown by solid line in FIG. 1 and the center position of luminescence thereof is represented by $(y_1+y_2)/2$.

For example, assume that the center position is deviated from a normal landing position by $-\Delta y$. Then, if the instant of time of application of the modulating signal pulse w is shifted by a small time $\Delta t$ to provide a pulse having a pulse width from the instant of time $t_1+\Delta t$ to the instant of time $t_2+\Delta t$, the beam spot 43 moves from a position $y_1+\Delta y$ on the phosphor corresponding to the voltage values $v_1+\Delta v$ and $v_1'+\Delta v$ of the deflection waveforms v and v' to a position $y_2+\Delta y$ corresponding to the voltage values $v_2-\Delta v$ and $v_2'-\Delta v$ to provide a spot shape shown by broken line in FIG. 1. Accordingly, the center position of luminescence of the beam spot takes a position of $(y_1+y_2)/2+\Delta y$ or the center position of luminescence is moved by a distance $\Delta y$, which provides an effect equivalent to the case where a resting spot is excited into luminescence at the normal landing position.

If the center position of luminescence is deviated from the normal position by $\Delta y$, the modulating signal pulse is shifted by a time $\Delta t$ in a direction reverse to that in the above case to move the center of luminescence by $-y$, thereby bringing it into the normal landing position.

Figure 4:
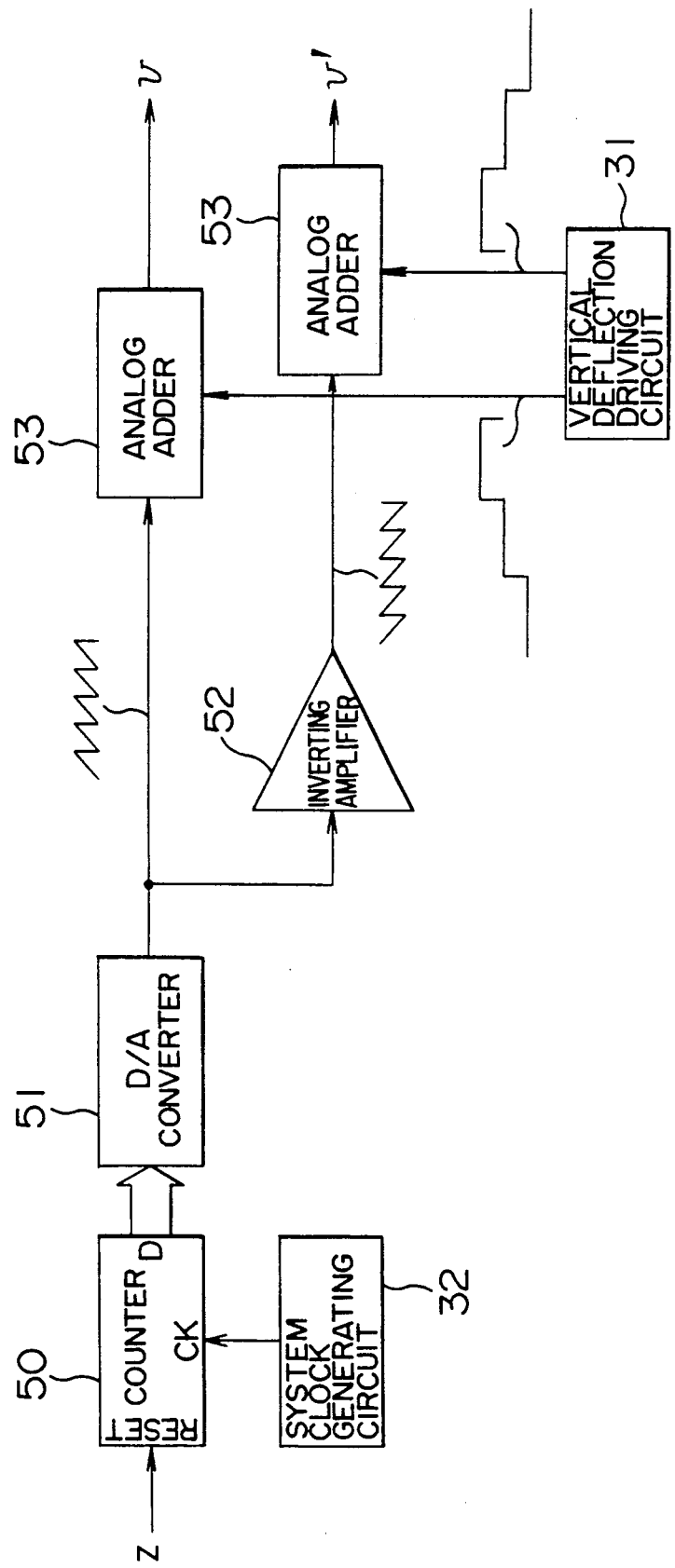
FIGS. 4 and 5 are circuit diagrams of circuits for generating the deflection waveforms.
Figure 5:
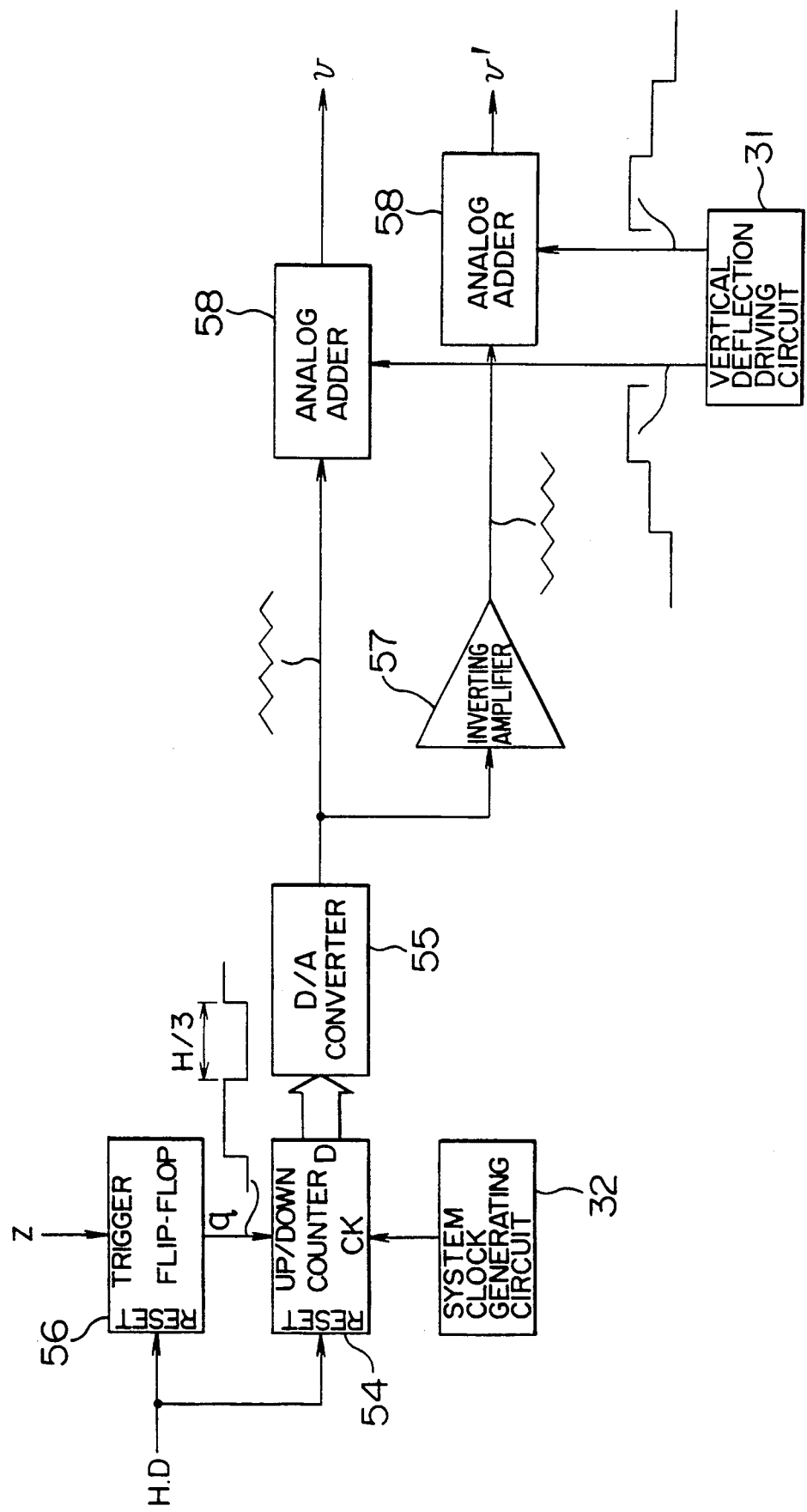
Figure 13:
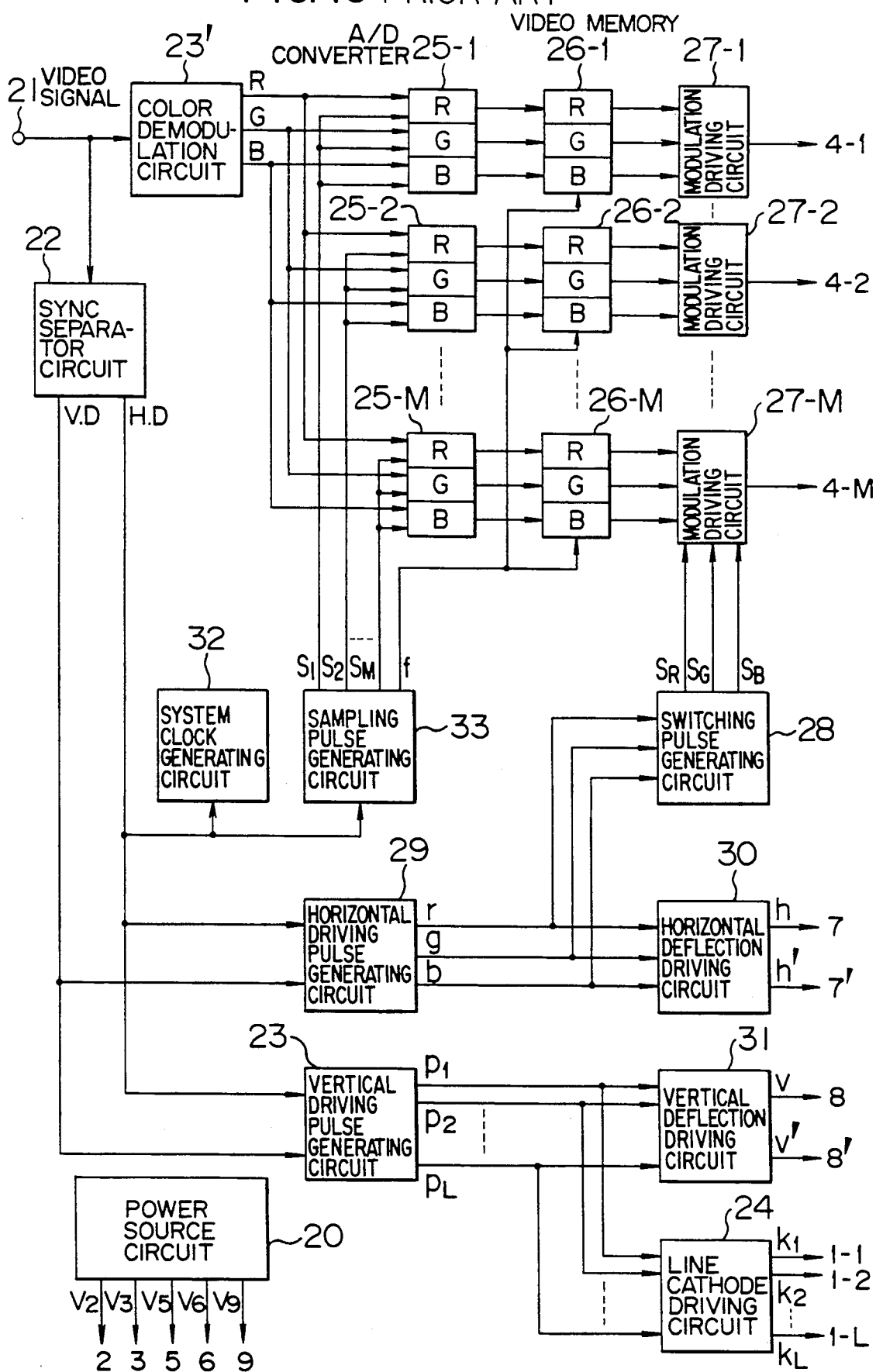
FIG. 13 is a circuit diagram of a circuit for driving the conventional flat type cathode-ray tube.
Figure 14:
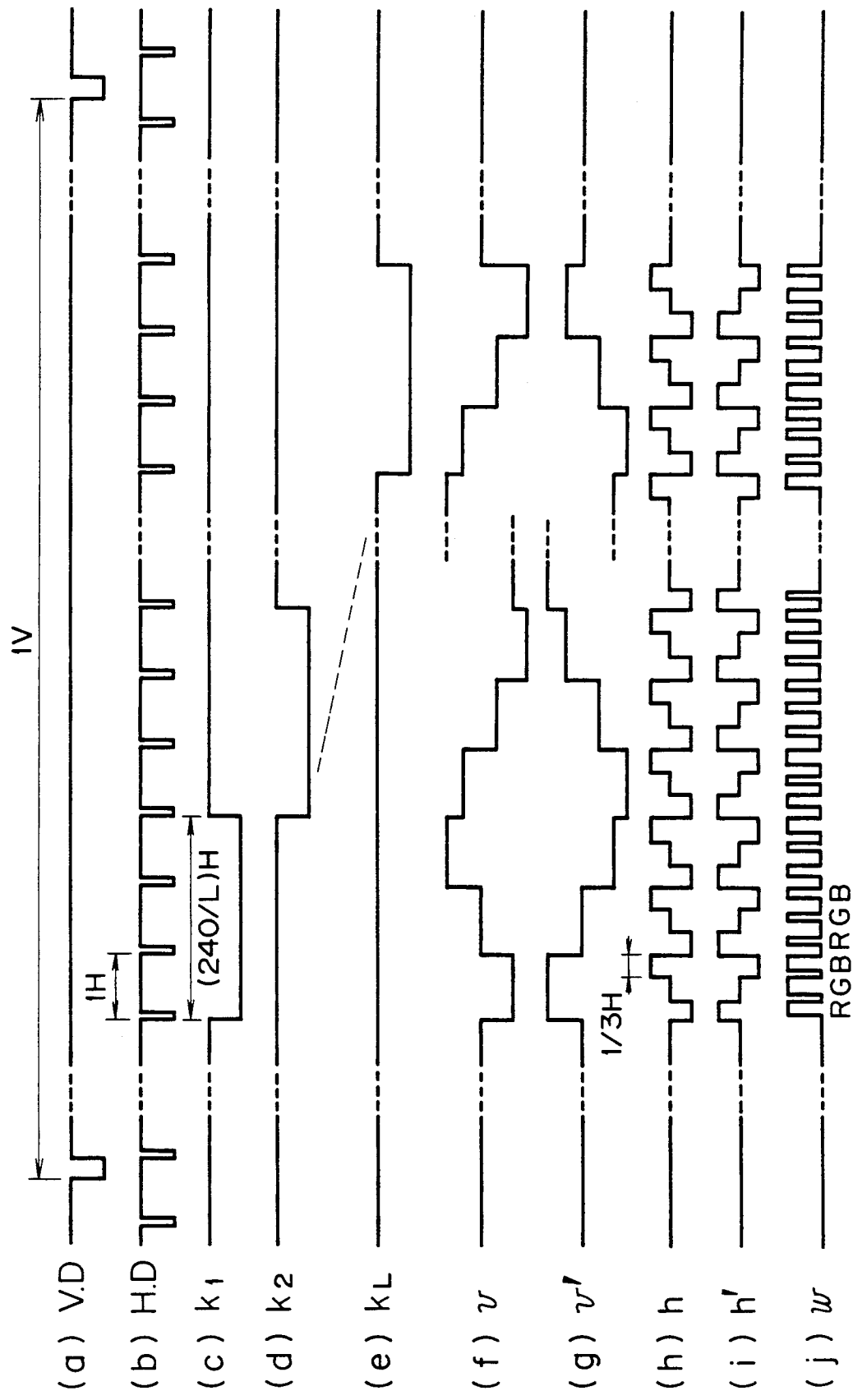
FIG. 14 is a time chart of driving waveforms used in the conventional flat type cathode-ray tube.

Next, the construction of a driving circuit for realizing the control method in the present embodiment will be explained in reference to an example shown in FIG. 4. Stepped vertical deflection voltage waveforms v and v' used in the conventional method are generated by a known vertical deflection driving block 31 (shown in FIG. 13) in which digital data stored in a memory is D/A converted. A sawtooth wave necessary for the present invention is generated by the combination of a counter 50 and a D/A converter 51. The counter 50 receives at its CK input terminal, system reference clocks from a system clock generating circuit 32 which have a sufficiently high frequency, and is reset by pulses z synchronous with signals r, q and b which are used for change-over of R, G and B video signals at every H/3 period. The output value of the counter 50 is incremented for each clock and is returned to zero simultaneously with resetting of the counter. This digital output value of the counter 50 is converted into an analog voltage value by the D/A converter 51, thereby obtaining a sawtooth wave in which a monotonic increase is repeated at a period of H/3. A sawtooth wave including a repetitive monotonic decrease can be readily obtained by polarity-inverting the output of the D/A converter 52 by an inverting amplifier 52.

On the other hand, a triangular waveform can be generated by the combination of an up/down counter 54, a D/A converter 55 and a flip-flop 56 shown in FIG.

5. The counter 54 is reset by a horizontal synchronizing signal H.D. The flip-flop 56 is reset by the horizontal synchronizing signal H.D and takes an output value q which has high and low levels alternated each time the above-mentioned pulse z is inputted. The output signal q of the flip-flop 56 is used for change-over of count-up and count-down of the counter 54. If the construction is designed such that the count-up is made when the signal q is high and the count-down is made when it is low, the output value of the counter 54 monotonically increases in the first H/3 period, monotonically decreases in the next H/3 period and monotonically increases at the further next H/3 period. The output value of the counter 55 is converted into an analog value by the D/A converter 55, thereby obtaining a desired waveform. A waveform having an inverted polarity is obtained by porality-inverting the output of the D/A converter 55 by an inverting amplifier 57.

The thus obtained sawtooth waves or triangular waves and the conventional stepped waves are added in analog adders 53 or 58, and the outputs of the adders 53 or 58 are voltage-amplified to obtain vertical deflection waveforms v and v' necessary for the present invention.

Figure 6:
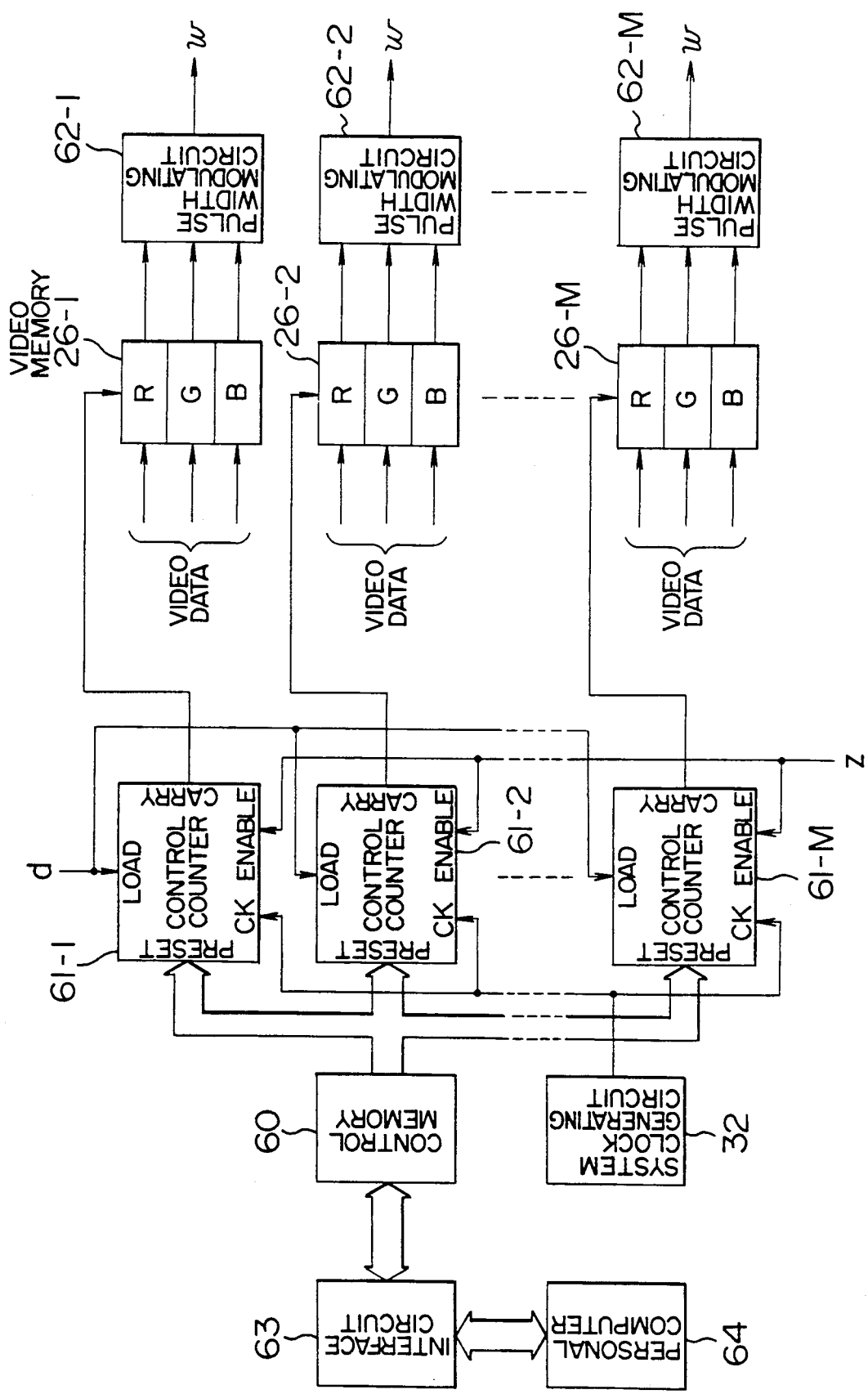
FIG. 6 is a circuit diagram of a circuit for controlling the instant of time of application of a beam modulating signal.

A control memory 60 shown in FIG. 6 for storing digital data for control is prepared for controlling the instant of time of application of a beam modulating signal to a modulating electrode. In a 1H period immediately preceding a 1H period when an image is to be displayed, control data corresponding to respective electron beams are successively read from the memory 60 by a trigger signal d having M pulses synchronous with the horizontal synchronizing signal H.D. and are preset into control counters 61-1 to 61-M. Upon start of the 1H period when the image is to be displayed, the counters 61-1 to 61-M start the counting of the system reference clocks from the system clock generating circuit 32 by the signal z synchronous with the horizontal driving pulses r, g and b. Each counter generates a carry pulse at a point of time when the preset data value has been counted. The carry pulses from the counters 61-1 to 61-M are supplied to video signal memories 26-1 to 26-M so that R, G and B video data are read from the memories. The video data read from the memory 26 are supplied to a pulse width modulating circuit 62 for conversion into analog signals having pulse widths corresponding to the data values. The analog signals are applied as a serial signal w of R, G and B to the electron beam modulating electrode 4. As a result, the instant of time of application of the modulating signal is changed by the control data. In the case where a pulse amplitude modulation is employed for the modulation method, it suffices that the pulse width modulating circuits 62-1 to 62-M arc replaced by D/A converters.

It does not necessarily follow that one control data is allotted to one electron beam. If one control data is allotted to a plurality of electron beams in accordance with the degree of non-uniformity in landing of beam spots on the screen 9, the saving of the capacity of the control memory is possible. The writing of the control data into the control memory 60 can be made by an external personal computer 64 through an interface circuit 63 separately prepared, thereby making it possible to perform adjustment while visually confirming a change of the position of a beam spot on the screen.

Figure 7:
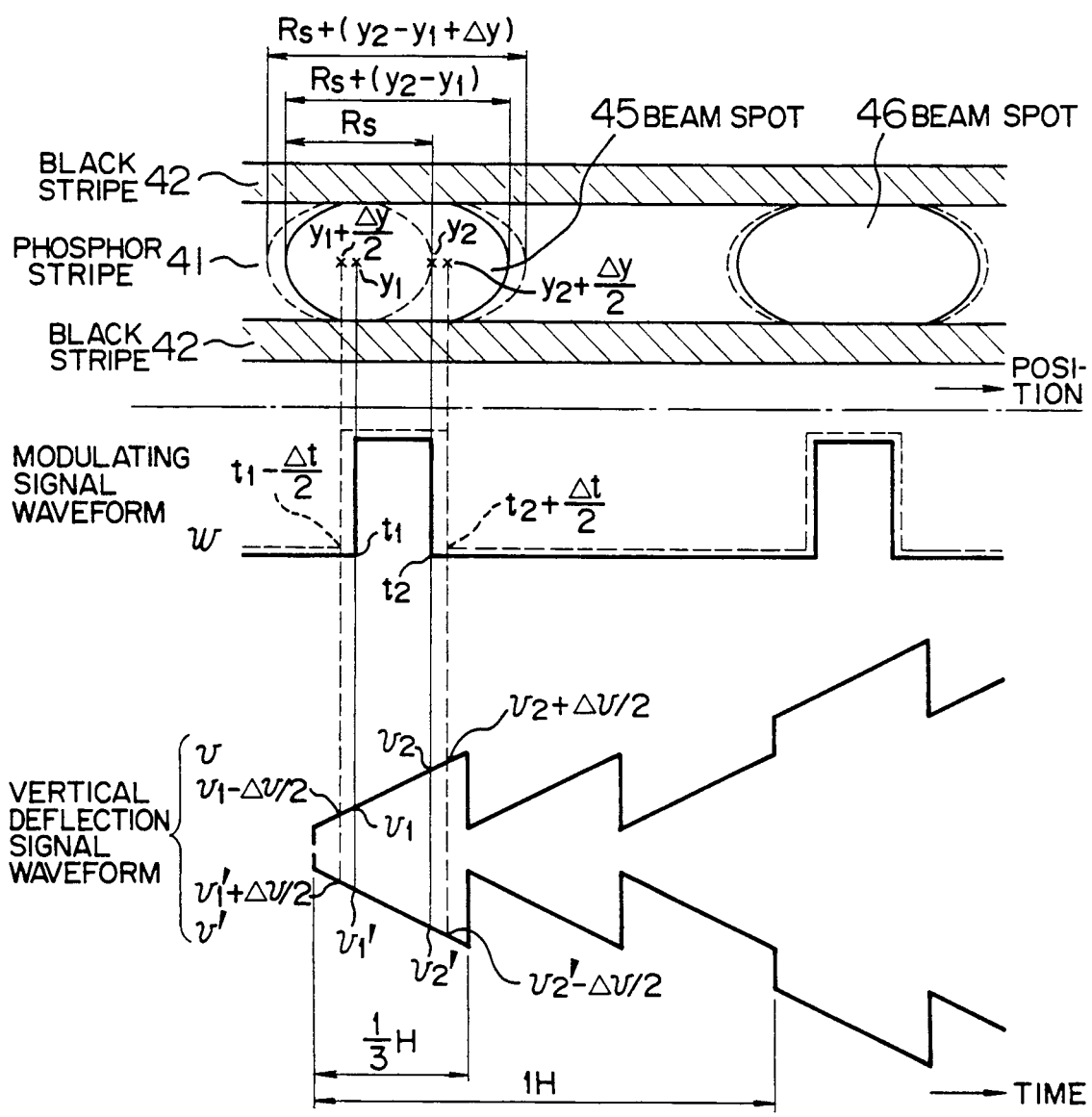
FIG. 7 is a view for explaining the operation of a second embodiment of the present invention.
Figure 8:
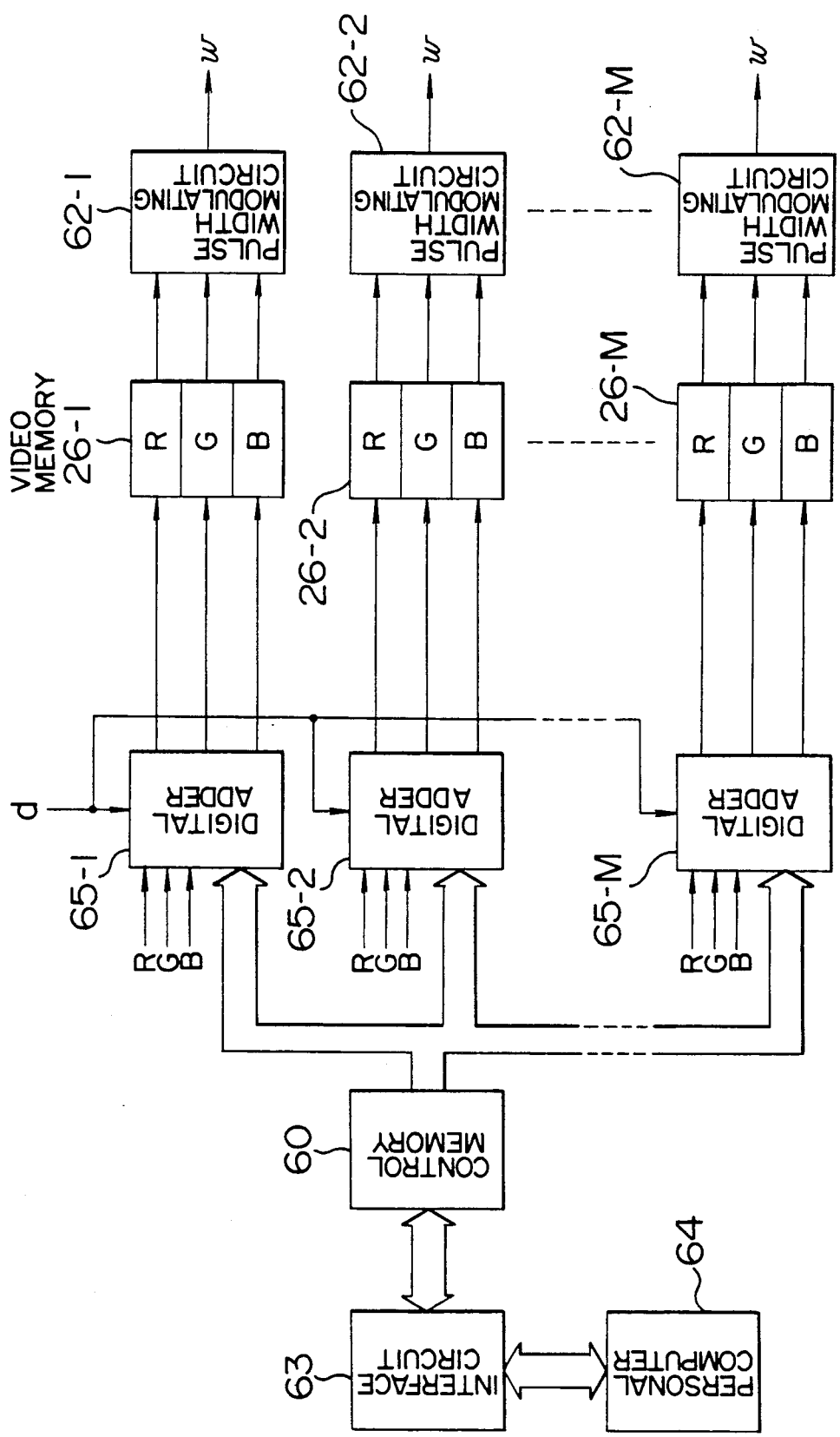
FIG. 8 is a circuit diagram of a circuit for controlling the pulse width of a beam modulating signal in accordance with a pulse width modulation system.

Next, the second embodiment of the present invention will be explained in reference to FIGS. 7 to 9. The explanation will be made limited to the beam landing in the vertical direction in order to avoid complexity.

First, explanation will be made of voltage waveforms used for the deflection and modulation of an electron beam and the principle of change in diameter of a luminous spot on a screen in association with the voltage waveforms. The upper portion of FIG. 7 shows a phosphor stripe 41 formed on the screen and beam spots 45 and 46 in a form in which the vertical direction and the horizontal direction are interchanged as a matter of convenience. The lower portion of FIG. 7 shows a pair of vertical deflection voltage waveforms v and v' and an electron beam modulating waveform w.

The vertical deflection waveforms v and v' may be the same as those explained in conjunction with the embodiment of the first invention and the process of deflection of an electron beam by the vertical deflection waveforms are also the same as that in the first embodiment of the present invention. Therefore, further explanation thereof will be omitted.

For the above vertical deflection waveforms v and v', a beam modualting signal w having a pulse width within the period of H/3 is applied to the electron beam modulating electrode 4. If a pulse waveform shown by solid line in FIG. 7 is employed as the beam modulating signal w, the electron beam excites the phosphor 41 into luminescence while moving in the vertical direction in accordance with the vertical deflection voltage waveforms from the instant of time $t_1$ of the pulse w to the instant of time $t_2$ of fall of the pulse w. Namely, the beam spot 45 moves from a position $y_1$ on the phosphor corresponding to the voltage values $v_1$ and $v_1'$ of the deflection waveforms v and v' to a position $y_2$ corresponding to the voltage values $v_2$ and $v_2'$. In this time, the beam spot has a diameter shown by solid line in FIG. 7 and represented by $R_s+(y_2-y_1)$ wherein $R_s$ is the diameter of a spot excited into luminescence in the case where the team rests on the phosphor.

Now, assume that the spot diameter is smaller than a desired spot diameter by $\Delta y$. Then, if the pulse width of the modulating signal is increased by a minute time $\Delta t$ to provide a pulse width (shown by broken lines) from the instant of time $t_1-\Delta t/2$ to the instant of time $t_2+\Delta t/2$, the beam spot 45 moves from a position $y_1 - \Delta y/2$ corresponding to the voltage values $v_1-\Delta v/2$ and $v_1'+\Delta v/2$ of the reflection waveforms v and v' to a position $y_2+\Delta y/2$ corresponding to the voltage values $v_2+\Delta v/2$ and $v_2-\Delta v/2$. Accordingly, the beam spot diameter takes a value of $R_s+(y_2-y_1+\Delta y)$ or the spot diameter is increased to $\Delta y$ as shown by broken lines, thereby obtaining the desired spot diameter. On the other hand, if the spot diameter is larger than the desired spot diameter by $\Delta y$, the pulse width of the modulating signal is decreased by $\Delta t$ in contrary to the above case to decrease the spot diameter by $\Delta y$, thereby providing the desired value.

Next, the construction of a driving circuit for realizing the control method in the present embodiment will be explained in reference to an example shown in FIG. 8. Since a circuit construction for generating the vertical deflection voltage waveforms (v and v' is the same as that in the embodiment of the first invention, explanation thereof will be omitted. In order to control the pulse width of the beam modulating signal, there is prepared a control memory 60 for storing digital data for control. In the case of a pulse width modulation system, in an 1H period immediately preceding an 1H period when an image is to be displayed, control data corresponding to respective electron beams are successively read from the memory 60 by a trigger signal d having M pulses synchronous with the horizontal synchronizing signal H.D, are added to R, G and B video data in adders 65-1 to 65-M, and are stored into video memories 26-1 to 26-M. Accordingly, the widths of pulses converted into analog signals in pulse width modulating circuits 62-1 to 62-M are widened correspondingly to the addition of the control data.

Figure 9:
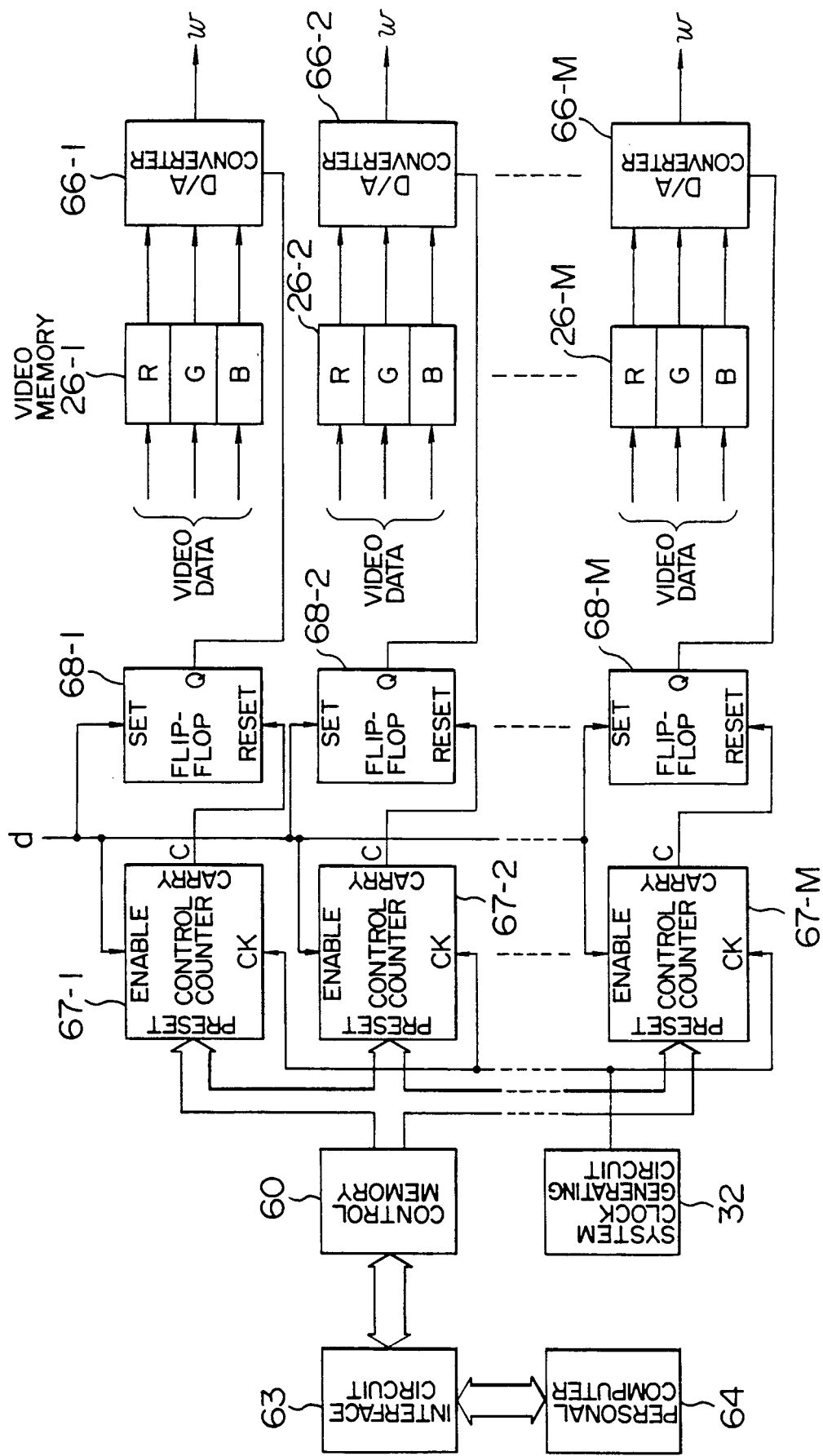
FIG. 9 is a circuit diagram of a circuit for controlling the pulse width of a beam modulating signal in accordance with a pulse amplitude modulation system.

In the case of a pulse amplitude modulation system, a beam modulating signal the pulse width of which is determined by the control data can be obtained by a circuit construction shown in FIG. 9 or in such a manner that the pulse width modulating circuits 62-1 to 62-M are replaced by D/A converters 66-1 to 66-M, data of the control memory 60 are preset into pulse width control counters 67-1 to 67-M, and RS flip-flops 68-1 to 68-M are set by the trigger signal d having M pulses synchronous with the horizontal synchronizing signal H.D and reset by carry output pulses c of the pulse width control counters 67-1 to 67-M. An operation of changing the value of the control data in conformity with the degree of vertical deflection can be performed by an external personal computer 64 through an interface circuit 63 separately prepared, thereby making it possible to perform adjustment while visually confirming a change of the diameter of a beam spot on the screen.

Next, as the third embodiment of the present invention will be explained a method in which in the case of making the beam modulation in accordance with the pulse width modulation system in the first embodiments and second embodiment of the present invention, the pulse width is changed in accordance with the level of a video signal and equally in positive and negative directions around the instant of time when a pulse having the minimum width necessary for representation as an image is to be generated.

Figure 10:
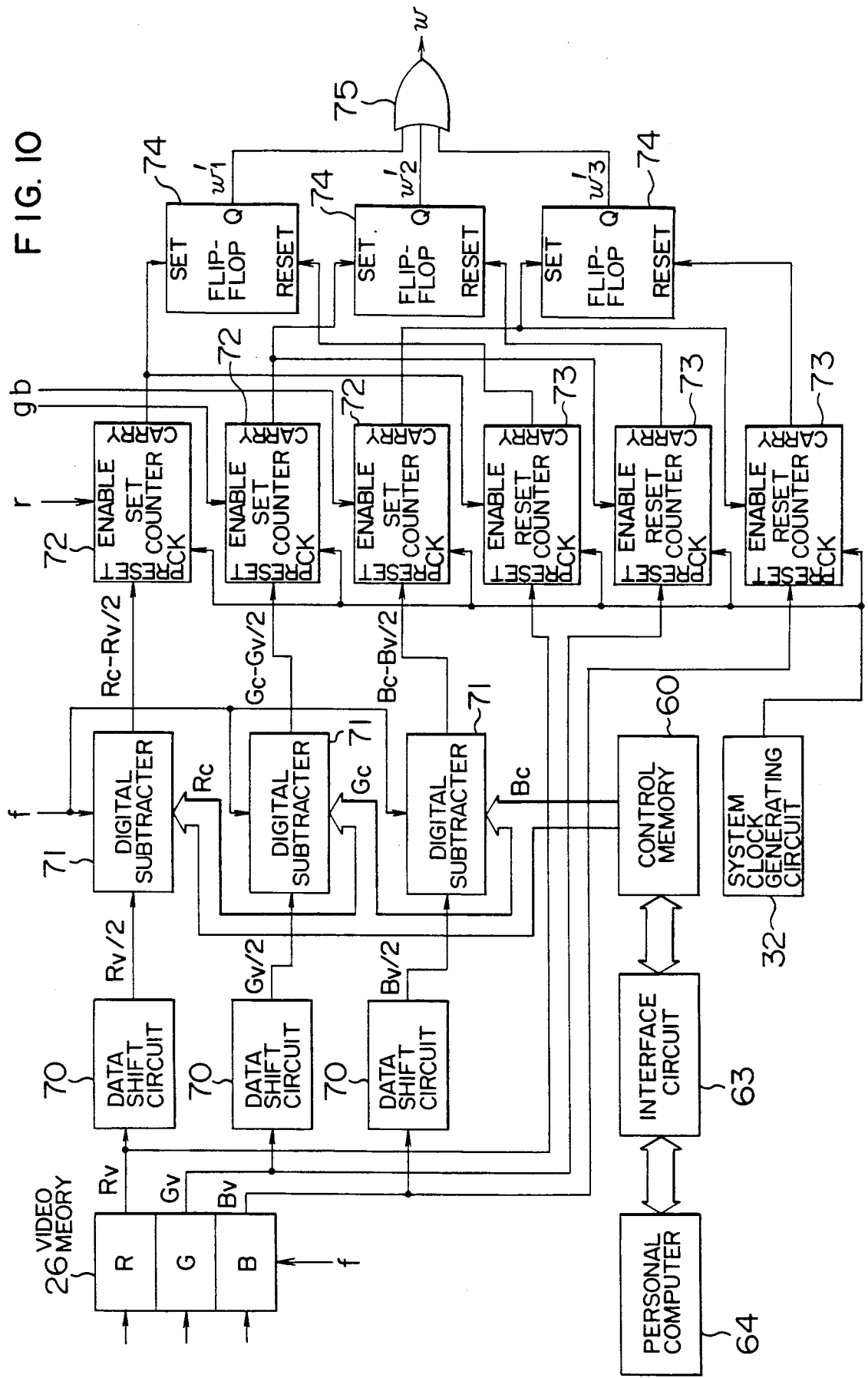
FIG. 10 is a circuit diagram of a third embodiment of the present invention.
Figure 12A:
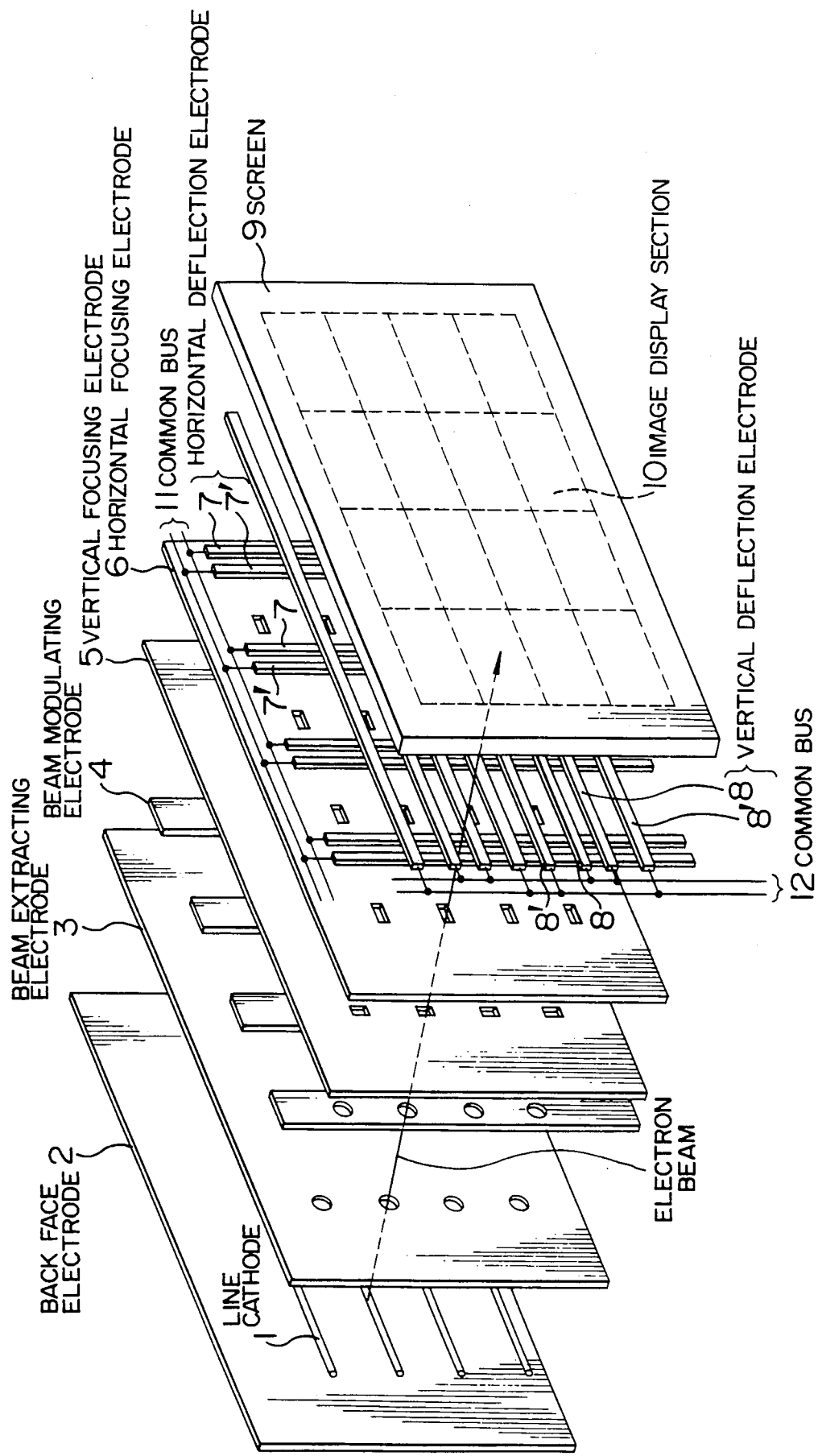
FIG. 12A is a view showing the internal structure of the conventional flat type cathode-ray tune and FIG. 12B is a structural view showing a practical structure of a prior art cathode-ray tube corresponding to the cathode-ray tube of FIG. 12A.
Figure 12B:
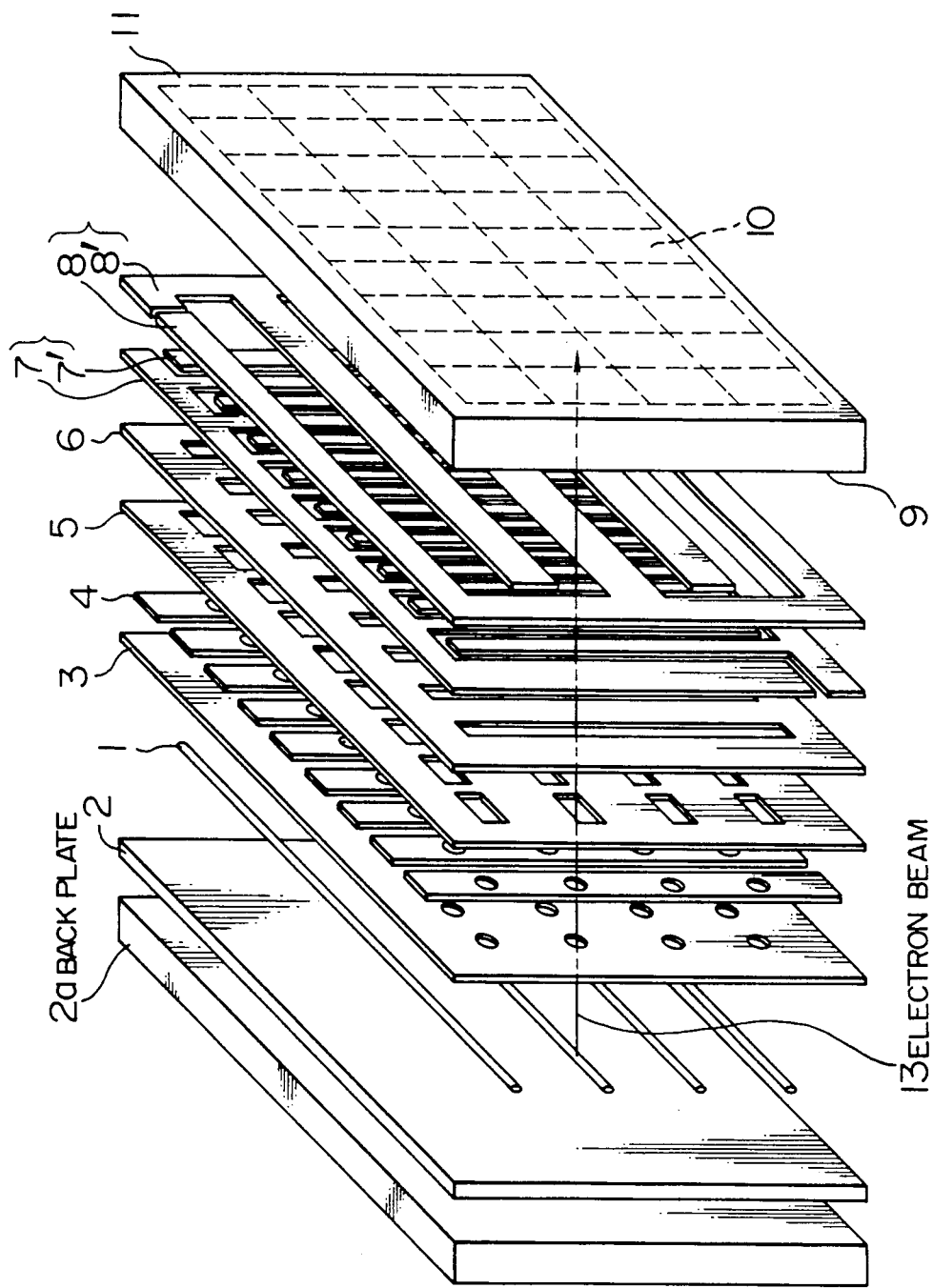

FIG. 10 shows a circuit diagram of a pulse width modulating circuit in the present embodiment and FIG. 11 shows a time chart of the operation of this circuit. M circuits are required but only one circuit is shown for simplification, R, G and B video digital data, after having been stored into a video memory 26 in a 1H period preceding an 1H period when an image is to be displayed, are respectively read from the memory by a trigger signal f synchronous with the horizontal vertical pulses r, g and b and the read data values $R_v$, $G_v$ and $B_v$ are shifted by one bit toward the lower bit direction in data shift circuits 70 to be reduced to $R_v/2$, $G_v/2$ and $B_v/2$, respectively. On the other hand, control data $R_c$, $G_c$ and $B_c$ are read by the trigger signal f from a control memory 60 in which data determining the center position of a beam modulating pulse is stored, and the shifted video signal data $R_v/2$, $G_v/2$ and $B_v/2$ are subtracted from the control data $R_c$, $G_c$ and $B_c$ in subtracters 71. Next, data $R_c-R_v/2$, $G_c-G_v/2$ and $B_c-B_v/2$ obtained by the operation of subtraction are respectively preset into set counters 72 and at the same time the video data $R_v$, $G_v$ and $B_v$ are respectively preset into reset counters 73.

At a point of time entering the 1H period when the image is to be displayed, the set counters 72 successively start their counting operations in response to the horizontal deflection pulses r, g and b and generate carry pulses after having counted the preset data. The carry pulses are used as set signals for RS flip-flops 74 as well as count start signals for the reset counters 73. After having made the counting corresponding to the video data $R_v$, $G_v$ and $B_v$, the reset counters 73 generate carry pulses to reset the RS flip-flops 74. Through this operation, the outputs of the flip-flops 74 produce pulse width-modulated signals $w_1'$, $w_2'$ and $w_3'$ (see FIG. 11) which in turn are converted into a serial signal or a beam modulating signal w by an OR circuit 75.

With such a construction, it is possible to change the pulse width of the modulating signal in accordance with the level of the video signal and equally in positive and negative directions around the instant of time of supply of the control data, that is, the instant of time of generation of the pulse having the minimum width necessary for representation of an image.

Both the first and second embodiments have been explained in conjunction with only the beam landing and spot diameter control in the vertical direction. It is obvious that the present invention is also applicable to the horizontal direction if the vertical deflection in the explanation is replaced by the horizontal deflection.

Effects provided by the first, second and third embodiments of the present invention are as follows.

According to the first embodiment, since the positions of spots on the screen for exciting phosphor into luminescence can be individually controlled for a plurality of electron beams, respectively, it is possible to eliminate brightness differences resulting from localized non-uniformity of beam landing positions caused from the precision of work and/or the precision of assemblage of electrodes contributing to the vertical deflection and horizontal deflection in a flat type cathode-ray tube and to eliminate unevenness in brightness even at the boundary portions between image display sections, thereby greatly improving the uniformity of image quality.

According to the second embodiment, since the diameters of spots on the screen for exciting phosphor into luminescence can be individually controlled for a plurality of electron beams, respectively, it is possible to eliminate brightness differences and/or color differences resulting from localized non-uniformity of beam spot diameters produced by the vertical deflection and horizontal deflection in a flat type cathode-ray tube and to eliminate unevenness in brightness and/or unevenness in color even at the boundary portions between image display sections, thereby greatly improving the uniformity of image quality.

According to the third embodiment, even if a beam modulating signal is pulse width-modulated in controlling the position or diameter of a spot on the screen for exciting phosphor into luminescence, this modulation is made without an inconvenience that the position of the beam spot is one-sided to either one of upward and downward directions or either one of rightward and leftward directions on the screen, and there is not a fear that the uniformity of image quality may change between high-light images and low-light images.

We claim:

1. A method of driving an image display device including a luminous means comprising luminous image-display sections vertically and horizontally aligned to be scanned and excited into luminescence responsive to electron beams impinging thereon to display an image, a means for generating a plurality of electron beams travelling toward said luminous means, an electron beam quantity control means for controlling a quantity of said electron beams generated by said generating means, and an electron beam deflecting means for deflecting said quantity of electron beams, said method comprising the steps of:

(a) enabling said deflection means by a deflection signal additively comprising a first periodic deflection signal and a second periodic deflection signal, said first deflection signal being provided to deflect each electron beam to cause it to land on a respective one of said image display sections at about a predetermined landing position thereon and said second deflection signal being provided to further deflect in a same direction as the beam deflection caused by said first deflection signal each of said electron beams to displace its landing position within a small range of distance from said predetermined landing position and not extending into a scan range of an adjacent electron beam; and (b) enabling said electron beam quantity control means by applying thereto a pulse signal for controlling a beam quantity of each of said electron beams at an optional timing selected in a time period of said second deflection signal, such that none of the adjacent beam spots extends across a luminous center of the other on said luminous means, thereby controlling spacing of electron beam luminous spots adjacent on boundary portions of respective image display sections and spacing of those adjacent on and in each image display section to be spacings of such uniformity so as to generate no viewable discontinuities in brightness or color between the luminous spots.

2. A method as in claim 1, wherein said first periodic deflection signal is a substantially staircase-shaped waveform having periodic beam quiescent periods, and said second periodic deflection signal is a non-staircase waveform without beam quiescent periods.

3. A method as in claim 2, wherein said first periodic deflection signal is an electrostatic deflection signal having a substantially staircase-shaped voltage waveform, and said second periodic deflection signal is an electrostatic deflection signal having a substantially saw tooth-shaped voltage waveform.

4. A method as in claim 2, wherein said first periodic deflection signal is an electrostatic deflection signal having a substantially staircase-shaped voltage waveform, and said second voltage deflection signal is an electrostatic deflection signal having a substantially triangular-shaped voltage waveform.

5. A method as in claim 1, wherein said drive signal for enabling said electron beam quantity controlling means is a signal which is pulse width modulated by a digital video signal, and said method further comprises modulating said pulse width of said drive signal with respect to a center of said pulse width at an instant of time when the signal pulse is generated having a minimum width corresponding to the least significant bit of the video signal, such that said pulse width of drive signal has equal changes made in opposite directions from said center along the time axis in accordance with the level of said video signal.

6. A method of driving an image display device including a luminous means comprising luminous image-display sections vertically and horizontally aligned to be scanned and excited into luminescence responsive to electron beams impinging thereon to display an image, a means for generating a plurality of electron beams travelling toward said luminous means, an electron beam quantity control means for controlling a quantity of said electron beams generated by said generating means, and an electron beam deflecting means for deflecting said quantity of electron beams, said method comprising the steps of:

(a) enabling said deflection means by a deflection signal additively comprising a first periodic deflection and a second periodic deflection signal, said first deflection signal being provided to deflect each electron beam to cause it to land on a respective one of said image display sections at about a predetermined landing position thereon and said second deflection signal being provided to further deflect in a same direction as the beam deflection caused by said first deflection signal each of said election beams to displace its landing position within a small range of distance from said predetermined position and not extending into a scan range of an adjacent electron beam; and (b) driving said electron beam quantity control means by an electron beam quantity control signal generating means for generating each of a plurality of electron beam quantity control pulse signals and applying the same to said electron beam quantity control means by setting their pulse durations to an optional duration within a time range such that adjacent beam spots do not have widths which extend into each other on said luminous means and said optional durations being optionally set within a time period of said second deflection signal, thereby controlling widths of electron beam luminous spots adjacent each other on boundary portions of respective image display sections and widths of those adjacent each other on and in each image display section to be spot widths of such uniformity as to generate no viewable discontinuities in brightness and color between the luminous spots.

7. A method as in claim 6, wherein said first periodic deflection signal is a substantially staircase-shaped waveform having periodic beam quiescent periods, and said second periodic deflection signal is a non-staircase waveform without beam quiescent periods.

8. A method as in claim 7, wherein said first periodic deflection signal is an electrostatic deflection signal having a substantially staircase-shaped voltage waveform, and said second periodic deflection signal is an electrostatic deflection signal having a substantially saw tooth-shaped voltage waveform.

9. A method as in claim 7, wherein said first periodic deflection signal is an electrostatic deflection signal having a substantially staircase-shaped voltage waveform, and said second periodic deflection signal is an electrostatic deflection signal having a substantially triangular-shaped voltage waveform.

10. A method as in claim 6, wherein said pulse signal for enabling said electron beam quantity controlling means is a signal which is pulse width modulated by a digital video signal, and said method further comprises modulating said pulse width of said pulse signal with respect to a center of said pulse width at an instant of time when a signal pulse is generated having a minimum width corresponding to the least significant bit of the video signal, such that said pulse width of said pulse signal has equal changes made in opposite directions from said center along the time axis in accordance with the level of said video signal.

* * * * *